US012608189B2

(12) United States Patent
Nakamura et al.

(10) Patent No.: US 12,608,189 B2
(45) Date of Patent: Apr. 21, 2026

(54) DATA RELAY DEVICE FOR VEHICLE, AND DATA RELAY METHOD

(71) Applicant: TOYOTA JIDOSHA KABUSHIKI KAISHA, Toyota (JP)

(72) Inventors: Kaho Nakamura, Toyota (JP); Keisuke Tsuji, Nisshin (JP); Takehiro Kawaguchi, Toyota (JP); Kei Morizumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 18/481,478

(22) Filed: Oct. 5, 2023

(65) Prior Publication Data

US 2024/0264821 A1 Aug. 8, 2024

(30) Foreign Application Priority Data

Feb. 3, 2023 (JP) ................................ 2023-015312

(51) Int. Cl.
*G06F 8/65* (2018.01)
*G07C 5/00* (2006.01)

(52) U.S. Cl.
CPC ............... *G06F 8/65* (2013.01); *G07C 5/008* (2013.01)

(58) Field of Classification Search
CPC .................................. G06F 8/65; G07C 5/008
See application file for complete search history.

(56) References Cited

U.S. PATENT DOCUMENTS

| | | | | |
|---|---|---|---|---|
| 2018/0203637 A1* | 7/2018 | Furuya | ................. | G06F 3/0641 |
| 2021/0011709 A1* | 1/2021 | Itatsu | ...................... | B60R 16/02 |
| 2021/0035046 A1* | 2/2021 | Bhardwaj | ............... | G06N 5/04 |
| 2021/0201599 A1* | 7/2021 | Shionoya | ............. | G07C 5/0841 |
| 2021/0345076 A1* | 11/2021 | Lee | ........................ | H04W 8/245 |
| 2023/0043338 A1* | 2/2023 | Bi | ........................ | G06F 3/0679 |

FOREIGN PATENT DOCUMENTS

| | | | | |
|---|---|---|---|---|
| JP | 2019-023931 A | 2/2019 | | |
| WO | WO-2017047469 A1 * | 3/2017 | ............ | H04L 12/40 |

* cited by examiner

*Primary Examiner* — Daxin Wu
(74) *Attorney, Agent, or Firm* — SoraIP, Inc.

(57) ABSTRACT

A CPU receives update data, stores the received update data in a first memory, transmit the update data via an internal communication line and a specific communication line while prohibiting data transmission from an internal device via the internal communication line and permitting data transmission from a specific device via the specific communication line, erase from the first memory the update data that has been successfully transmitted via the internal communication line and the specific communication line, and when a data volume stored in the first memory becomes equal to or larger than a predetermined set volume, erase from the first memory the update data for the internal device even if this update data is the update data that has not yet been transmitted via the specific communication line.

5 Claims, 3 Drawing Sheets

DATA RELAY DEVICE FOR VEHICLE, AND DATA RELAY METHOD

CROSS-REFERENCE TO RELATED APPLICATION

This application claims priority to Japanese Patent Application No. 2023-015312 filed on Feb. 3, 2023, incorporated herein by reference in its entirety.

BACKGROUND

1. Technical Field

The present disclosure relates to data relay devices for vehicles and data relay methods.

2. Description of Related Art

A vehicle disclosed in Japanese Unexamined Patent Application Publication No. 2019-023931 (JP 2019-023931 A) includes a gateway and control devices. The gateway is connected to the control devices via communication lines. When updating information in any of the control devices, the gateway is connected to an external tool. The gateway repeatedly receives a plurality of pieces of data for update from the external tool. The gateway sends the received data to the control device to which the data is supposed to be sent.

SUMMARY

In the technique of relaying data from a higher-level device to send the data to a lower-level device as in JP 2019-023931 A, there are cases where there are many lower-level devices to which data should be sent. A plurality of pieces of data to be sent to each lower-level device may be different from lower-level device to lower-level device. In this case, the gateway needs to relay a large number of pieces of data. If such a large amount of data is sent to the target lower-level devices after checking the destination of the data piece by piece, it will take a lot of time. Therefore, there is a demand for a technique of sending a large amount of data received from a higher-level device to a lower-level device in a short processing time.

A data relay device for a vehicle that solves the above problem includes an execution unit and a storage unit. The data relay device is configured to communicate with an update device located outside the vehicle, is configured to communicate with an internal device located inside the vehicle via an internal communication line, and is configured to communicate with a specific device located inside the vehicle via a specific communication line different from the internal communication line.

The execution unit is configured to receive update data for the internal device or the specific device from the update device, store the received update data in the storage unit, transmit the update data stored in the storage unit via the internal communication line and the specific communication line while prohibiting data transmission from the internal device via the internal communication line and permitting data transmission from the specific device via the specific communication line, erase from the storage unit the update data that has been successfully transmitted via the internal communication line and the specific communication line, and when a data volume stored in the storage unit becomes equal to or larger than a predetermined set volume, erase from the storage unit the update data for the internal device including the update data for the internal device that has not yet been transmitted via the specific communication line.

A data relay method that solves the above problems is a data relay method that is performed by a data relay device for a vehicle.

The data relay device includes an execution unit and a storage unit. The data relay device is configured to communicate with an update device located outside the vehicle, is configured to communicate with an internal device located inside the vehicle via an internal communication line, and is configured to communicate with a specific device located inside the vehicle via a specific communication line different from the internal communication line.

The data relay method includes performing, by the execution unit, receiving update data for the internal device or the specific device from the update device, storing the received update data in the storage unit, transmitting the update data stored in the storage unit via the internal communication line and the specific communication line while prohibiting data transmission from the internal device via the internal communication line and permitting data transmission from the specific device via the specific communication line, erasing from the storage unit the update data that has been successfully transmitted via the internal communication line and the specific communication line, and when a data volume stored in the storage unit becomes equal to or larger than a predetermined set volume, erasing from the storage unit the update data for the internal device including the update data for the internal device that has not yet been transmitted via the specific communication line.

In each of the above technical ideas, the update data is transmitted to the internal communication line and the specific communication line without checking whether the update data is supposed to be sent to the internal device or the specific device. This eliminates the need for the process of sequentially checking the destination of the update data, and therefore reduces the processing time that is required to transmit a large amount of update data to the internal device and the specific device. However, transmitting the update data to the internal communication line and the specific communication line as described above raises the following concern. Data transmission from the specific device via the specific communication line is not prohibited. Therefore, if data transmission from the specific device to the specific communication line continues, the situation in which the data relay device cannot send the update data to the specific communication line may continue. Accordingly, the data volume in the storage unit may increase as the update data that could not be sent accumulates therein. In this case, the update data that has not yet been sent to the specific device may be erased from the storage unit when transmitting or receiving new update data. In the above configuration, when the data volume in the storage unit becomes equal to or larger than the set volume, the update data for the internal device including the update data for the internal device that has not yet been transmitted via the specific communication line is erased from the storage unit. This frees up storage space of the storage unit and reduces the risk that the update data for the specific device that has not yet been transmitted to the specific communication line is erased.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a vehicle data relay device and a data relay method will be described below with reference to the drawings.

Vehicle Overall Configuration

Figure 1:
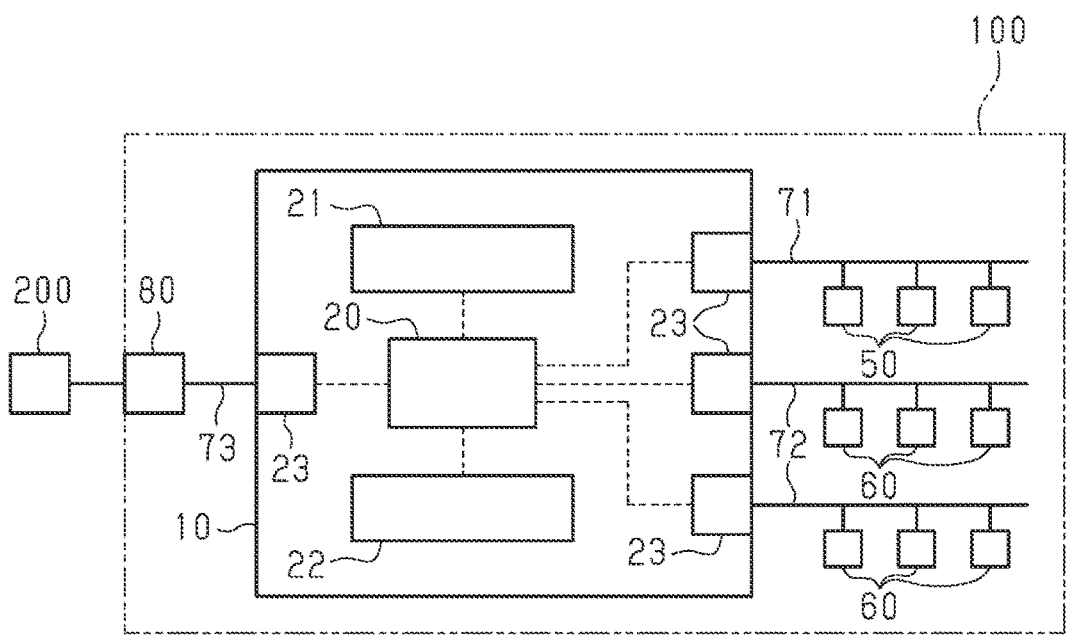
FIG. 1 is a diagram showing a schematic configuration of a vehicle.

As shown in FIG. 1, a vehicle 100 includes a data relay device (hereinafter abbreviated as relay device 10), a plurality of specific devices 50, a plurality of internal devices 60, a specific communication line 71, a plurality of internal communication lines 72, an external communication line 73, and a connector 80.

The relay device 10 has a central processing unit (hereinafter referred to as CPU 20), a first memory 21 as a storage medium, a second memory 22 as a storage medium, and a plurality of communication controllers 23. CPU 20 is the execution unit. The first memory 21 is a storage unit. The first memory 21 is a RAM. The second memory 22 is a ROM. The second memory 22 stores in advance various programs and various data necessary for executing the various programs. The CPU 20 implements various processes described later by executing various programs stored in the second memory 22. At that time, the CPU 20 appropriately refers to various data stored in the second memory 22. In addition, the CPU 20 temporarily stores data in the first memory 21 when executing various processes. The communication controllers 23 are provided for each communication line such as a specific communication line 71, a plurality of internal communication lines 72 and an external communication line 73. One communication line is connected to one communication controller. The communication controller 23 transmits data to the communication line according to commands from the CPU 20, receives data from the communication line, and transfers the data to the CPU 20. In this embodiment, the communication system in the vehicle 100 is configured so as to perform communication using CAN with Flexible Data rate (CAN-FD) as a communication protocol. Note that the specific communication line 71, the plurality of internal communication lines 72, and the external communication line 73 are of standards capable of realizing the same communication speed.

The connector 80 is connected to the relay device 10 via the external communication line 73. A processing device outside the vehicle 100 can be connected to the connector 80.

The specific device 50 is an electronic control unit that controls the drive system of the vehicle 100. One of the plurality of specific devices 50 controls the engine, which is the driving source of the vehicle 100. One of the plurality of specific devices 50 controls a hydraulic brake device. One of the plurality of specific devices 50 controls a steering device. In this embodiment, these multiple specific devices 50 are connected to the relay device 10 via the same specific communication line 71. A plurality of specific devices 50 and the relay device 10 can communicate via a specific communication line 71.

The internal device 60 is an electronic control unit that controls in-vehicle items other than the drive system of the vehicle 100. Examples of the in-vehicle items other than the driving system of the vehicle 100 include an air conditioner, a meter display device, a car navigation device, an audio device, and a blinker device. A plurality of internal devices 60 are connected to the relay device 10 via a plurality of internal communication lines 72 provided separately from the specific communication line 71. A plurality of internal devices 60 are connected to one internal communication line 72. Two of the plurality of internal communication lines 72 is illustrated in FIG. 1. The multiple internal devices 60 and the relay device 10 can communicate via an internal communication line 72.

The specific device 50 and the internal device 60 are processing devices provided inside the vehicle 100. The specific device 50 and the internal device 60 are collectively referred to as an in-vehicle ECU. Also, the specific communication line 71 and the internal communication line 72 are collectively referred to as an in-vehicle communication line. Each in-vehicle ECU can transmit and receive message data to and from other in-vehicle ECUs via an in-vehicle communication line. The message data is notification data for notifying other in-vehicle ECUs of necessary information. Apart from this message data, the in-vehicle ECU can receive update data intended for itself. The update data is data for rewriting the contents stored in the in-vehicle ECU, such as a control program stored in the in-vehicle ECU. The message data and update data contain destination information. The destination information is an identifier that indicates the destination in-vehicle ECU. The in-vehicle ECU refers to the destination information included in each data to determine the data whose transmission destination is itself.

Update Device

An update device 200 is prepared in a vehicle maintenance shop or the like. Update device 200 is a processing device for transmitting update data to vehicle 100. Update device 200 is a processing device external to vehicle 100 that can be connected to connector 80 of vehicle 100 via a cable. The update device 200 includes a main body including a CPU and a memory, an input device for inputting information from the outside to the CPU of the main body, a display device for displaying information according to a command from the CPU of the main body, have The memory of the update device 200 stores in advance a plurality of pieces of update data for each in-vehicle ECU of the vehicle 100. The update data stored in the memory of the update device 200 are prepared for each of the plurality of in-vehicle ECUs in the vehicle 100. A plurality of pieces of update data is prepared for one in-vehicle ECU.

When the update device 200 is connected to the connector 80, the update device 200 and the relay device 10 can communicate via the external communication line 73. In this communicable state, the update device 200 can execute an external process U for sending update data to the relay device 10. During the execution of this external process U, the update device 200 continues to send update execution signals to the relay device 10. Details of the external process U will be described later.

Functions of Relay Device

The CPU 20 of the relay device 10 functions in either the normal mode or the update mode when the start switch for instructing the activation of the vehicle 100 is on. The update mode is a temporary processing mode such as during inspection before the vehicle 100 is shipped from the factory or after the vehicle 100 is shipped from the factory. Normal mode is a processing mode when not in update mode.

CPU 20 functions in normal mode when it is not receiving an update execution signal. In the normal mode, the CPU 20 relays transmission and reception of message data across different in-vehicle communication lines such as the specific communication line 71 and the internal communication line 72. For example, it is assumed that message data is transmitted from a first specific device, which is one of the plurality of specific devices 50, to a first internal device, which is one of the plurality of internal devices 60. In this case, the CPU 20 of the relay device 10 transmits the message data received via the specific communication line 71 to the internal communication line 72 to which the first internal device is connected. The second memory 22 stores a management table for identifying in-vehicle communication lines to which each in-vehicle ECU is connected. The CPU 20 identifies the transfer destination of the message data by referring to this management table.

The CPU 20 functions in update mode on condition that it is receiving an update execution signal. The update execution signal is predetermined as a command signal to command functioning in the update mode. The CPU 20 relays transmission and reception of update data in the update mode. That is, in the update mode, the CPU 20 receives update data from the update device 200 and transmits the received update data to each in-vehicle communication line. Details will be described later. Note that the CPU 20 prohibits transmission of message data from the internal device 60 via the internal communication line 72 in the update mode. The CPU 20 appropriately transmits a signal instructing this transmission prohibition to each internal device 60. On the other hand, the CPU 20 permits transmission of message data from the specific device 50 via the specific communication line 71 in the update mode. Therefore, even when the CPU 20 is functioning in the update mode, the CPU 20 has the function of transferring the message data transmitted from the specific device 50 to the other internal device 60 as in the normal mode.

The CPU 20 performs the following basic process on the first memory 21 in both the normal mode and the update mode. In the basic process, the CPU 20 erases the data stored in the first memory 21 in order from the oldest when the used capacity KA of the first memory 21 becomes equal to or larger than the predetermined limited capacity K1. The used capacity KA is the data volume stored in the first memory 21. The limited capacity K1 is determined in advance as a value close to the upper limit of the volume that the first memory 21 can store. The second memory 22 preliminarily stores the limited capacity K1.

How to Update the In-Vehicle ECU

Figure 2:
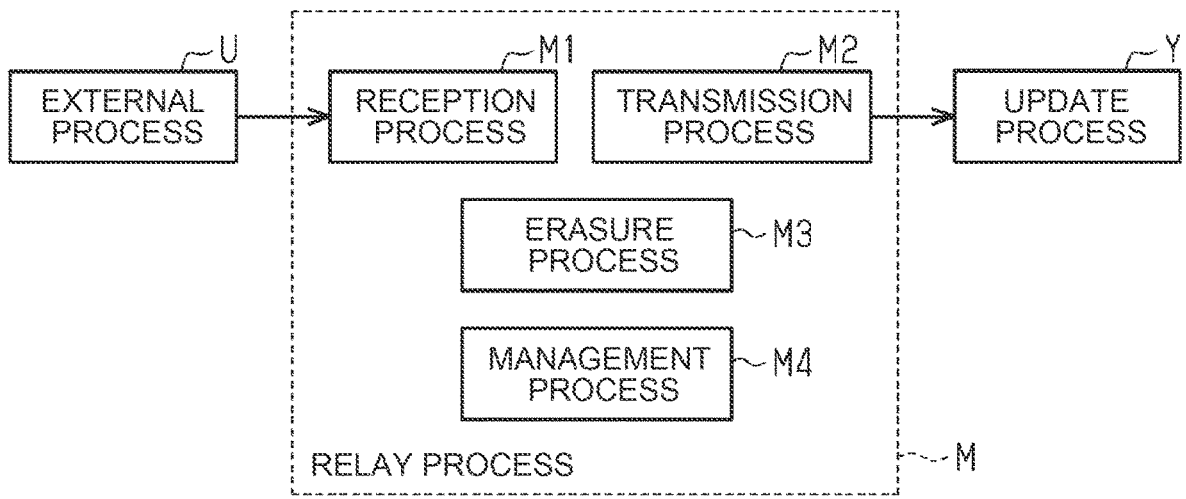
FIG. 2 is a diagram showing the processing performed by the update system.

When the update device 200 is connected to the connector 80, the update device 200, the relay device 10, each in-vehicle ECU, and each communication line connecting these have an update system for updating the contents of each in-vehicle ECU. A method for updating each in-vehicle ECU by the update system will be described below. As shown in FIG. 2, an update device 200 performs an external process U in the update system. Further, in the update system, the relay device 10 performs relay process M. Further, in the update system, each in-vehicle ECU performs the update process Y. The details of each of these processes will be described below in order.

External process U will be described. The update device 200 starts the external process U according to an instruction from the operator via the input device. In the external process U, the update device 200 sequentially transmits a plurality of pieces of update data to the relay device 10. The update device 200 transmits the update data as many as the number of pieces of update data that fits in the data volume that is allowed to be transmitted to the external communication line 73 in one transmission cycle. The update device 200 repeats transmission of update data until transmission of all update data is completed. After completing transmission of all update data, the update device 200 transmits a termination request signal to the relay device 10. Then, when the update device 200 receives an end reception signal, which will be described later, from the relay device 10, the update device 200 displays a message indicating the completion of the update on the display device. After this display, the update device 200 terminates the external process U according to an instruction from the operator. Note that, as described above, the update device 200 continues to transmit the update execution signal to the relay device 10 while the external process U is being executed. After completing the external process U, the update device 200 ends transmission of the update execution signal.

Relay Process

While the update device 200 is executing the external process U, the CPU 20 of the relay device 10 functions in update mode in response to receiving the update execution signal. At the same time, the CPU 20 performs the relay process M, which is a process dedicated to the update mode. The relay process M includes the following four processes: a reception process M1, a transmission process M2, an erasure process M3, and a management process M4. The CPU 20 performs these four processes in parallel. The CPU 20 continuously performs these four processes while functioning in the update mode, that is, from the start of reception of the update execution signal until the end of reception of the update execution signal.

Reception Process

The reception process M1 will be described. In the reception process M1, the CPU 20 repeatedly confirms whether or not the update data transmitted from the update device 200 is received. When receiving update data from the update device 200, the CPU 20 stores the received update data in the first memory 21. The process of repeating the reception and storage of the update data in this way is the reception process M1. As described above, the update data received by the CPU 20 from the update device 200 is intended for the specific device 50 or the internal device 60.

Transmission Process

The transmission process M2 will be described. Note that the CPU 20 performs the transmission process M2 for each in-vehicle communication line. That is, the CPU 20 concurrently performs the transmission process M2 for the number of the in-vehicle communication lines connected to the relay device 10. In the following, the transmission process M2 will be described for one in-vehicle communication line.

Figure 3:
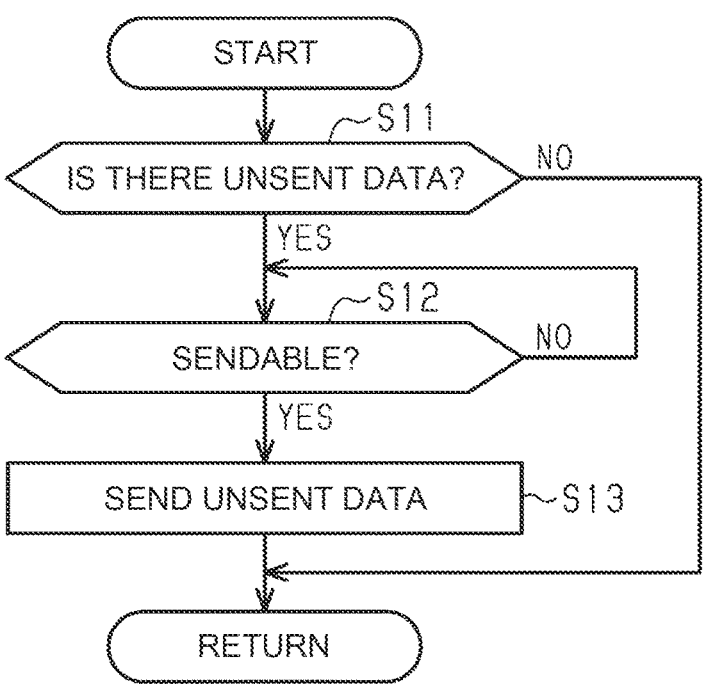
FIG. 3 is a flowchart showing the procedure of transmission processing.

As shown in FIG. 3, the CPU 20 first performs step S11 in the transmission process M2. In S11, the CPU 20 determines whether there is a plurality of pieces of update data stored in the first memory 21 that have not yet been transmitted to the target in-vehicle communication line when step S11 is performed. The CPU 20 makes the determination of S11 by referring to the transmitted information described later in S13. When there is no unsent data for the target in-vehicle communication line (S11: NO), the CPU 20 performs step S11 again. On the other hand, if there is unsent data (S11: YES), the CPU 20 proceeds to S12.

In S12, the CPU 20 determines whether the update data can be transmitted to the target in-vehicle communication line. The CPU 20 makes a determination in S12 depending on whether message data is being received from the in-vehicle ECU connected to the target in-vehicle communication line. While message data is being received, a signal indicating that message data is being received is sent to the CPU 20 from the communication controller 23 connected to the target in-vehicle communication line. When the message data is being received from the in-vehicle ECU, the CPU 20 determines that the update data cannot be transmitted to the target in-vehicle communication line (S12: NO). In this case, the CPU 20 waits for transmission of update data by repeating step S12 until transmission of message data from the in-vehicle ECU is completed. Then, when the transmission of the message data from the in-vehicle ECU is completed and the update data can be transmitted to the target in-vehicle communication line (S12: YES), the CPU 20 proceeds to S13. When message data is not being received from the in-vehicle ECU when the process proceeds from S11 to S12 (S12: YES), the CPU 20 proceeds to S13 at that point.

In S13, the CPU 20 once transmits the unsent data to the target in-vehicle communication line to the in-vehicle communication line. In consideration of the data volume that can be transmitted at one time, the CPU 20 transmits in this S13 as many pieces of unsent data as the number of pieces of unsent data that fits in the data volume allowed to be transmitted to the in-vehicle communication line. At this time, the CPU 20 selects the unsent data to be sent without checking the destination information attached to the update data. In other words, the CPU 20 treats data that has not been transmitted to the target in-vehicle communication line as a transmission target regardless of which in-vehicle ECU is the transmission destination. Therefore, the update data whose transmission destination is an in-vehicle ECU that is not connected to the target in-vehicle communication line is also included in the transmission target. Note that the CPU 20 generates copy data of the original data stored in the first memory 21 when transmitting the unsent data. Then, the CPU 20 transmits the copy data to the target in-vehicle communication line. When generating copy data, the CPU 20 attaches transmitted information to the original data stored in the first memory 21. The transmitted information is information indicating that transmission to the target in-vehicle communication line has been completed. The CPU 20 attaches, for example, an identifier pre-assigned to the target in-vehicle communication line as the transmitted information. The second memory 22 stores in advance an identifier for each in-vehicle communication line. After transmitting the unsent data once, the CPU 20 returns to S11. The transmission process M2 is the process of repeating the above steps S11, S12, and S13. By executing the transmission process M2, the CPU 20 transmits each piece of update data received from the update device 200 once to all the in-vehicle communication lines regardless of the transmission destination.

Erasure Process

The erasure process M3 shown in FIG. 2 will be described. The CPU 20 constantly monitors a plurality of pieces of update data stored in the first memory 21 in the erasure process M3. Then, the CPU 20 determines whether there is completion data, which is update data that has already been transmitted to all the in-vehicle communication lines, based on the transmitted information. When the completion data is detected, the CPU 20 erases the completion data from the first memory 21. As described above, in the external process U, the update device 200 transmits a termination request signal to the relay device 10 after transmitting all update data stored therein to the relay device 10. In the erasure process M3, the CPU 20 of the relay device 10 transmits an end acceptance signal to the update device 200 when erasing all the update data stored in the first memory 21 is completed after receiving the end request signal. The erasure process M3 is the process of sequentially erasing the completed data while monitoring the first memory 21 in this manner.

Management Process

Figure 4:
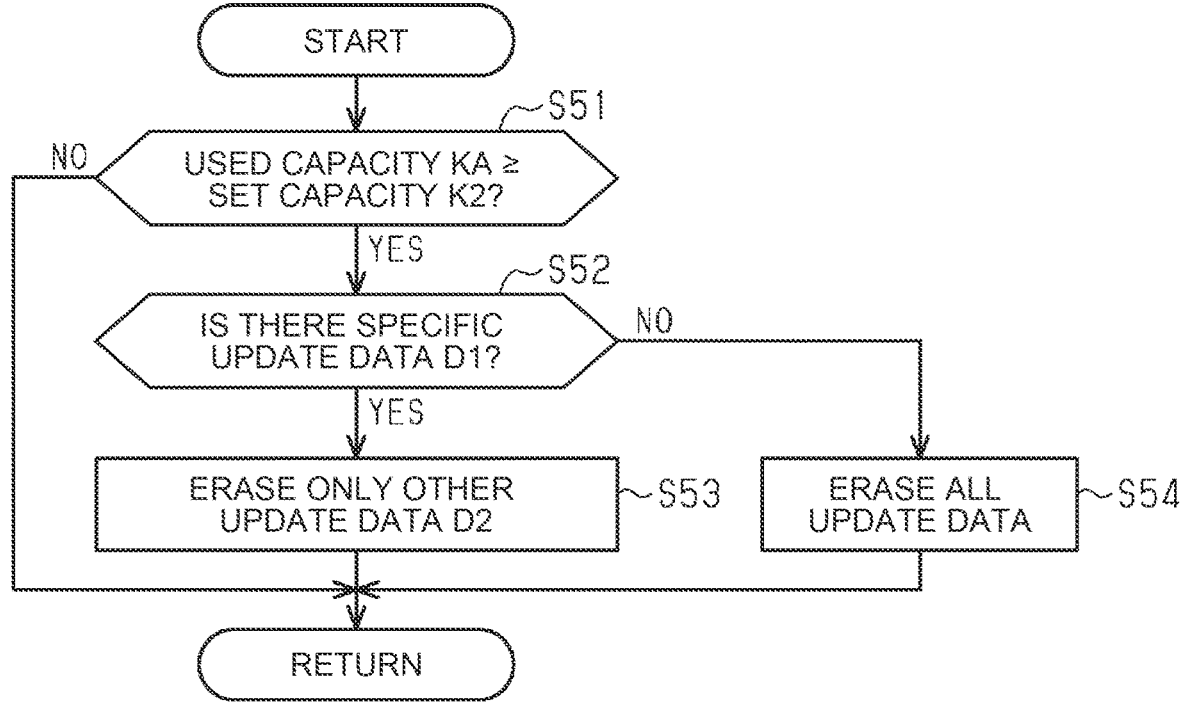
FIG. 4 is a flowchart showing the procedure of management processing.

The management process M4 will be explained. As shown in FIG. 4, the CPU 20 first perform step S51 in the management process M4. In S51, the CPU 20 determines whether the current used capacity KA of the first memory 21 is equal to or larger than the set capacity K2. The set capacity K2 is predetermined as a value slightly smaller than the limited capacity K1. The set capacity K2 is, for example, 80% of the limited capacity K1. The second memory 22 stores the set capacity K2 in advance. When the used capacity KA of the first memory 21 is less than the set capacity K2 (S51: NO), the CPU 20 performs step S51 again. On the other hand, when the used capacity KA of the first memory 21 is equal to or larger than the set capacity K2 (S51: YES), the CPU 20 proceeds to step S52.

In S52, the CPU 20 determines whether there is specific update data D1, namely update data for any of the plurality of specific devices 50, in the plurality of pieces of update data currently stored in the first memory 21. The CPU 20 determines whether there is the specific update data D1 by referring to the destination information of each update data stored in the first memory 21. At this time, the CPU 20 also refers to the identifier of each in-vehicle ECU pre-stored in the second memory 22. When the specific update data D1 does not exist (S52: NO), the CPU 20 proceeds to step S54. In this case, the CPU 20 erases all update data stored in the first memory 21. After that, the CPU 20 returns to step S51.

On the other hand, in S52, when there is the specific update data D1 in the plurality of pieces of update data stored in the first memory 21 (S52: YES), the CPU 20 proceeds to step S53. In this case, the CPU 20 leaves the specific update data D1 in the first memory 21 out of the plurality of pieces of update data stored in the first memory 21, while the CPU 20 stores all of other update data D2 that is the update data for the internal device 60. After that, the CPU 20 returns to step S51. The management process M4 is the process of repeating the above steps S51, S52, S53, and S54.

Update Process

The update process Y shown in FIG. 2 will be described. Each in-vehicle ECU performs an update process Y upon receiving the transmission process M2 for the in-vehicle communication line to which it is connected. That is, each in-vehicle ECU receives the update data when the update data with itself as the transmission destination is transmitted to the in-vehicle communication line to which the in-vehicle ECU is connected. Then, each in-vehicle ECU rewrites the existing information stored therein based on the update data.

Functions of Embodiment

Figure 5:
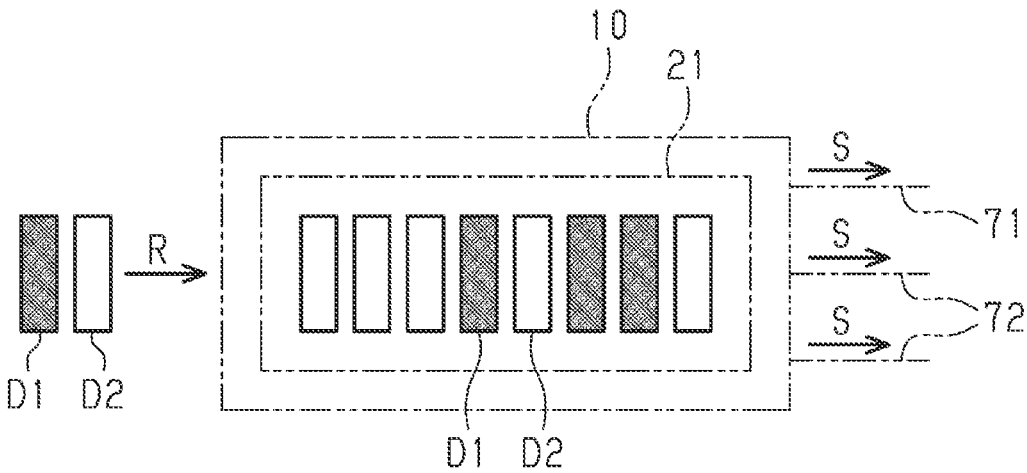
FIG. 5 is a schematic diagram illustrating transmission and reception of update data.

As indicated by an arrow R in FIG. 5, the relay device 10 sequentially receives update data from the update device 200 while the relay process M is being executed.

Figure 6:
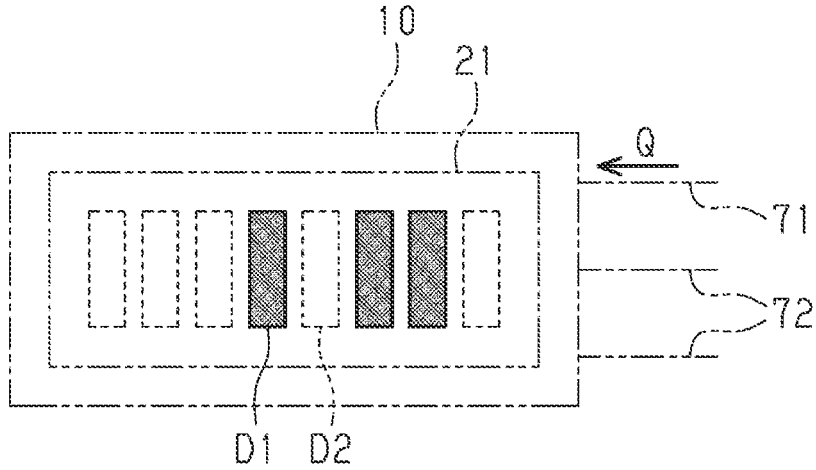
FIG. 6 is a schematic diagram for explaining the operation of management processing.

Note that in FIG. 5, the specific update data D1, which is the update data for the specific device 50, is shown in black. In addition, in FIG. 5, the other update data D2, which is the update data for the internal device 60, is shown in white. This also applies to FIG. 6, which will be described later. In the reception process M1, the CPU 20 of the relay device 10 temporarily stores the received update data in the first memory 21 upon receiving the update data. Then, as indicated by an arrow S in FIG. 5, in the transmission process M2, the CPU 20 transmits the update data stored in the first memory 21 to all the in-vehicle communication lines without confirming the transmission destination. As described above, the communication speeds of the specific communication line 71, the internal communication line 72, and the external communication line 73 are the same. Therefore, basically, the CPU 20 promptly transmits the update data received from the update device 200 to each in-vehicle communication line. In the erasure process M3, the CPU 20 erases from the first memory 21 the update data that have been transmitted to all the in-vehicle communication lines.

Now, during execution of the relay process M, the CPU 20 does not prohibit transmission of message data to the specific device 50. Therefore, message data may be transmitted from the specific device 50 to the relay device 10 via the specific communication line 71 during execution of the relay process M, as indicated by an arrow Q in FIG. 6. If the transmission of the message data continues, the situation where the relay device 10 cannot send update data to the specific communication line 71 continues. Here, as described above, the relay processing M includes the erasure process M3 for erasing the update data. As a condition for erasing the update data in this erasure process M3, the content that the transmission to all the in-vehicle communication lines is completed is set. Therefore, in consideration of the continuation of message data transmission via the specific communication line 71 as described above, the update data that has not been transmitted to the specific communication line 71 is not erased in the erasure process M3. Therefore, when the transmission of message data via the specific communication line 71 continues, the update data that have not been transmitted to the specific communication line 71 are accumulated in the first memory 21 without being erased. This unsent update data may include both the specific update data D1 and the other update data D2. Under such circumstances, it is assumed that the management process M4, which is one of the relay processes M, is not performed. In this case, in the first memory 21, the amount of update data that has not yet been transmitted to the specific communication line 71 gradually increases, and eventually the used capacity KA of the first memory 21 may become larger than the limited capacity K1. In this case, the CPU 20 erases part of the update data stored in the first memory 21 by the basic process. If the specific update data D1 is included in the update data to be erased, the specific update data D1 that has not yet been transmitted to the specific communication line 71 will be erased from the first memory 21.

In this respect, the CPU 20 of this embodiment performs a management process M4. That is, when the used capacity KA of the first memory 21 becomes equal to or larger than the set capacity K2, the CPU 20 erases the other update data D2 out of the update data stored in the first memory 21 as shown by dashes lines in FIG. 6. Erasing the other update data D2 eliminates the situation in which the first memory 21 runs out of storage space. Therefore, the specific update data D1 that has not been transmitted to the specific communication line 71 will not be erased by the basic process. When the transmission of the message data via the specific communication line 71 ends and the specific update data D1 becomes able to be sent to the specific communication line 71, the CPU 20 sends the specific update data D1 remaining in the first memory 21 to the specific communication line 71.

Effects of Embodiment (1) As described above, the CPU 20 transmits the update data to all the in-vehicle communication lines without checking whether the update data is supposed to be transmitted to the specific device 50 or the internal device 60. This eliminates the need for the CPU 20 to sequentially check the transmission destination of the update data. Therefore, the CPU 20 can shorten the processing time for transmitting a large amount of update data to the specific device 50 and the internal device 60. In addition, when the used capacity KA of the first memory 21 becomes equal to or larger than the set capacity K2, the CPU 20 eliminates the other update data D2 from the first memory 21 even if the other update data D2 is the update data that has not yet been transmitted to the specific communication line 71. By thus freeing up storage space of the first memory 21, it is possible to prevent the specific update data D1 that has not been transmitted to the specific communication line 71 from being erased by the basic process. Therefore, the specific update data D1 can be reliably transmitted to the specific device 50.

(2) The CPU 20 has both a relay function of transmitting update data transmitted from the update device 200 to each in-vehicle ECU and a relay function of message data between different in-vehicle ECUs. By configuring one processing device to have the two relay functions in this manner, the cost can be reduced compared to the case where one processing device is provided for each relay function.

(3) During execution of the external process U and the relay process M, each in-vehicle ECU can execute necessary processes other than the update process Y as appropriate. In performing such processes, information on the driving system of the vehicle 100, such as the operating state of the engine, can be indispensable information for each in-vehicle ECU. With the above configuration, transmission of such essential message data and execution of various processes are not delayed.

Modifications

The above embodiment can be modified as follows. The above embodiments and the following modifications can be combined with each other within a technically consistent range.

The relay device 10 does not need to have a function of relaying message data between different in-vehicle ECUs. In this case, apart from the relay device 10, the vehicle 100 may be equipped with a processing device dedicated to this relay function.

It is not essential that all the specific devices 50 are connected to the same specific communication line 71. One specific device 50 may be connected to one specific communication line 71. The internal device 60 may be connected to the communication line to which the specific device 50 is connected. Any communication line to which at least one specific device 50 is connected may be handled as the specific communication line 71.

The in-vehicle items to be controlled by the specific devices 50 are not limited to the examples of the above embodiment. Even during the relay process M, any electronic control unit that controls an in-vehicle item that requires data transmission may be handled as the specific device 50. When at least one such specific device 50 is mounted on the vehicle 100, continuous data transmission from the specific device 50 may result in a situation in which the first memory 21 runs out of storage space. Under such circumstances, the management process M4 functions effectively.

As described above, the number of specific devices 50 can be one or more.

The set capacity K2 may be appropriately set on the condition that it is smaller than the limited capacity K1. The set capacity K2 may be any value that is appropriate as a threshold for eliminating the situation in which the first memory 21 runs out of storage space.

Each of the memories 21 and 22 may be an electrically rewritable non-volatile storage medium.

The update device 200 may be connected to the relay device 10 wirelessly instead of wired.

The relay device 10 may have the following configuration on the condition that it has an execution unit and a storage unit that function in the same or substantially the same manner as in the above embodiment. The relay device 10 may be configured as a circuit including one or more processors that execute various processes according to a computer program (software). The relay device 10 may be configured as a circuit including one or more dedicated hardware circuits such as an application specific integrated circuit (ASIC), or a combination thereof, which performs at least part of the various types of processes.

What is claimed is:

1. A data relay device for a vehicle, the data relay device comprising a memory, and a processor configured to:

communicate with an update device located outside the vehicle, the update device being configured to send an update execution signal;

communicate with an internal device located inside the vehicle via an internal communication line;

communicate with a specific device located inside the vehicle via a specific communication line different from the internal communication line;

receive update data for the internal device from the update device;

receive specific update data for the specific device from the update device, store the update data and the specific update data in the memory;

transmit the update data stored in the memory via the internal communication line in response to receiving the update execution signal;

transmit the specific update data stored in the memory via the specific communication line in response to receiving the update execution signal;

prohibit transmitting message data from the internal device via the internal communication line in response to receiving the update execution signal;

permit transmitting specific message data from the specific device via the specific communication line in response to receiving the update execution signal;

erase the update data and the specific update data from the memory after transmitting the update data and the specific update data; and erase the update data from the memory in a case where a data volume stored in the memory becomes equal to or larger than a first set volume and smaller than a second set volume before transmitting the update data and the specific update data, the first set volume being smaller than the second set volume.

2. The data relay device according to claim 1, wherein the processor is configured to relay data transmission and reception between the internal communication line and the specific communication line in a case where the processor does not receive the update execution signal.

3. The data relay device according to claim 1, wherein the specific device is an electronic control unit configured to control a driving source of the vehicle or a brake device of the vehicle.

4. The data relay device according to claim 1, wherein the processor is configured to erase at least one of the update data and the specific update data from the memory in a case where the data volume stored in the memory becomes equal to or larger than the first set volume before sending the update data and the specific update data.

5. A data relay method for a data relay device for a vehicle, the data relay device including a processor and a memory, the data relay method comprising: by the processor, communicating with an update device located outside the vehicle, the update device being configured to send an update execution signal;

communicating with an internal device located inside the vehicle via an internal communication line;

communicating with a specific device located inside the vehicle via a specific communication line different from the internal communication line, receiving update data for the internal device from the update device, receiving specific update data for the specific device from the update device;

storing the update data and the specific update data in the memory, transmitting the update data stored in the memory via the internal communication line in response to receiving the update execution signal;

transmitting the specific update data stored in the memory via the specific communication line in response to receiving the update execution signal;

prohibiting transmitting message data from the internal device via the internal communication line in response to receiving the update execution signal;

permitting transmitting specific message data from the specific device via the specific communication line in response to receiving the update execution signal;

erasing the update data and the specific update data from the memory after transmitting the update data and the specific update data; and erasing the update data from the memory in a case where a data volume stored in the memory becomes equal to or larger than a first set volume and smaller than a second set volume before transmitting the update data and the specific update data, the first set volume being smaller than the second set volume.

* * * * *